United States Patent
Friday et al.

(10) Patent No.: US 12,045,350 B1
(45) Date of Patent: Jul. 23, 2024

(54) APPARATUS, SYSTEMS, AND METHODS RELYING ON NON-FLASHABLE CIRCUITRY FOR IMPROVING SECURITY ON PUBLIC OR PRIVATE NETWORKS

(71) Applicant: ZECURITY, LLC, Houston, TX (US)

(72) Inventors: Victor Bryan Friday, Houston, TX (US); David Lee Ronn, Houston, TX (US)

(73) Assignee: ZECURITY, LLC, Houston, TX (US)

( * ) Notice: Subject to any disclaimer, the term of this patent is extended or adjusted under 35 U.S.C. 154(b) by 0 days.

(21) Appl. No.: 18/367,939

(22) Filed: Sep. 13, 2023

(51) Int. Cl.
    *G06F 21/56* (2013.01)
    *G06F 21/53* (2013.01)

(52) U.S. Cl.
    CPC ............ *G06F 21/567* (2013.01); *G06F 21/53* (2013.01); *G06F 2221/034* (2013.01)

(58) Field of Classification Search
    CPC ... G06F 21/567; G06F 21/53; G06F 2221/034
    See application file for complete search history.

(56) References Cited

U.S. PATENT DOCUMENTS

| | | | |
|---|---|---|---|
| 6,438,130 B1 | 8/2002 | Kagan | |
| 6,453,353 B1 | 9/2002 | Win | |
| 6,631,453 B1 | 10/2003 | Friday | |
| 6,763,015 B1 | 7/2004 | Phillips | |
| 7,426,599 B2 | 9/2008 | Yancey | |
| 7,808,995 B2 | 10/2010 | Kuo | |
| 9,848,005 B2 * | 12/2017 | Ardeli | H04L 63/101 |
| 2005/0169270 A1 | 8/2005 | Mutou | |
| 2006/0041889 A1 | 2/2006 | Radulescu | |
| 2006/0253903 A1 | 11/2006 | Krumel | |
| 2008/0132288 A1 | 6/2008 | Misawa | |
| 2008/0137854 A1 | 6/2008 | Friday | |
| 2008/0279166 A1 | 11/2008 | Carty | |
| 2009/0150972 A1 * | 6/2009 | Moon | H04L 67/1076 709/202 |
| 2010/0061263 A1 | 3/2010 | Breeding | |
| 2010/0169964 A1 * | 7/2010 | Liu | H04L 61/2564 709/201 |
| 2010/0174608 A1 * | 7/2010 | Harkness | G06F 21/10 726/26 |

(Continued)

FOREIGN PATENT DOCUMENTS

| | | |
|---|---|---|
| CN | 103838670 A | 6/2014 |
| CN | 111193717 A * | 5/2020 |

(Continued)

*Primary Examiner* — Christopher A Revak
(74) *Attorney, Agent, or Firm* — Jonathan Pierce; Pierre Campanac; Porter Hedges LLP

(57) ABSTRACT

A hardware unit relies on non-flashable circuitry for improving security on a public or private network. The hardware unit can be added to a network without substantial modifications to the other devices already connected to the network. The hardware unit detects, and sometimes blocks or drops, data packets or frames that contain an instruction of a known file-sharing protocol other than a reading instruction. Thus, potential malware may be detected instantaneously by what it attempts to do, typically the creation, insertion, deletion, update, renaming, or writing of files. The hardware unit is used for screening files or emails stored on a client device and reporting threats.

16 Claims, 4 Drawing Sheets

(56) References Cited

U.S. PATENT DOCUMENTS

| | | | |
|---|---|---|---|
| 2012/0182891 A1* | 7/2012 | Lee | H04L 43/04 |
| | | | 370/252 |
| 2012/0240185 A1 | 9/2012 | Kapoor | |
| 2013/0275228 A1 | 10/2013 | Milazzo | |
| 2014/0269697 A1 | 9/2014 | Salys | |
| 2014/0328249 A1 | 11/2014 | Vermani | |
| 2017/0147820 A1* | 5/2017 | Schilling | G06F 21/561 |
| 2019/0313160 A1 | 10/2019 | Stokking | |
| 2020/0004962 A1 | 1/2020 | Araujo et al. | |
| 2021/0067534 A1 | 3/2021 | Mi | |
| 2021/0152860 A1* | 5/2021 | Patro | H04N 21/2402 |
| 2021/0226899 A1* | 7/2021 | Karunakaran | H04L 41/0803 |
| 2021/0377029 A1 | 12/2021 | Sloane | |
| 2022/0272039 A1 | 8/2022 | Cardona | |
| 2023/0117644 A1 | 4/2023 | Kamisetty | |
| 2023/0205715 A1 | 6/2023 | Harris | |
| 2024/0022638 A1 | 1/2024 | Wang | |

FOREIGN PATENT DOCUMENTS

| | | | | |
|---|---|---|---|---|
| EP | 1231538 A2 * | 8/2002 | | G06F 11/1662 |
| GB | 2441909 A | 3/2008 | | |
| WO | 2001075595 A2 | 10/2001 | | |
| WO | WO-03067810 A1 * | 8/2003 | | H04L 63/0254 |
| WO | 2004102326 A2 | 11/2004 | | |
| WO | 2016117302 A1 | 7/2016 | | |
| WO | 2016015981 A2 | 10/2016 | | |

\* cited by examiner

APPARATUS, SYSTEMS, AND METHODS RELYING ON NON-FLASHABLE CIRCUITRY FOR IMPROVING SECURITY ON PUBLIC OR PRIVATE NETWORKS

CROSS-REFERENCE TO RELATED APPLICATIONS

None.

FIELD OF THE INVENTION

This disclosure relates generally to apparatus, systems, and methods for improving security on a public or private network, such as detecting and/or preventing the unauthorized creation, insertion, deletion, update, renaming, or writing of files. This disclosure relates more particularly to apparatus, systems, and methods that rely on non-flashable circuitry, in contrast to software, for screening files or emails, and thus offer added protection against malware that may be embedded in these files or emails.

BACKGROUND OF THE INVENTION

Security on networks is usually provided by software. However, software can be altered by hackers or other unauthorized users. As such, software, regardless of its level of sophistication, may have an inherent weakness compared to non-flashable circuitry.

An example of a secure data storage device on a private or public network is described in U.S. Pat. No. 6,631,453 issued on Oct. 7, 2003. This patent reference discloses a data storage/transmission hardware device (or multiple devices physically linked together) with two (or more) connectors. One of the connectors allows for the reading and writing of information (referred to as the "active channel"), while the other connector(s) (referred to as "passive channels") allow solely for the reading of information. The actual limitation of "write" access of the passive connectors is brought about by a combination of hardware and firmware.

Security threats are often presented by malware that is embedded into the content of files or emails. The malware is usually detected by comparing the content of these files or emails with known pieces of code that have already been identified as malware and that are listed in a database. However, when using this detection technique, there is a time lapse between the time a new malware is created and the time this new malware is listed in a database. During this time lapse, security may be compromised. As such, identifying malware by its coding may not be sufficient.

In view of the foregoing, there is still a need in the art for apparatus, systems, and methods for screening files or emails, such as detecting and/or preventing the unauthorized creation, insertion, deletion, renaming, or update of files by malware embedded in these files or emails. Preferably, these apparatus, systems, and methods rely on non-flashable circuitry, in contrast to software, for improved security.

SUMMARY

The disclosure describes a hardware unit including an enclosure having first and second connections and non-flashable circuitry located in the enclosure. As used herein, non-flashable circuitry is such that firmware implemented on non-flashable circuitry cannot be altered or updated from a remote location. The non-flashable circuitry is connected to an application server via the first connection and to a machine via the second connection. The non-flashable circuitry is configured to receive data packets or frames from the application server via the first connection, determine whether the data packets or frames contain an instruction of a known file-sharing protocol other than a reading instruction, and record a database event on the storage medium when the data packets or frames contain the instruction other than the reading instruction.

The disclosure describes a system for screening files or emails stored on a client device. The system comprises an application server connected to the client device via a public or private network, a blade server or other machine, and a disk or other storage medium. The disk may or may not be integrated with the hardware unit. The application server is programmed to retrieve a file or an email stored on the client device and open or execute the file or email on a virtual machine hosted on the application server. Malware potentially embedded into the file or email is detected when it causes the application server to send a data packet or frame containing an instruction other than a reading instruction to the blade server through the hardware unit in order, for example, to infect the blade server.

The disclosure describes a method of screening files or emails stored on a client device that utilizes the hardware unit and/or system described above. Preferably, the method comprises the steps of periodically inspecting the storage medium for one or more newly recorded database events, and transmitting the one or more newly recorded database events. The one or more newly recorded database events may be transmitted to the application server, the client device, or any external location. Preferably, each database event contains a unit identifier of the hardware unit, a sequentially generated event identifier, a client identifier of the customer, the current date, the current time, an error return code, an event type, a result which describes the action taken by the hardware unit, the directory of the file which sent the data packet, the source address of the URL which sent the data packet, the filename for the source which sent the data packet, the destination address of the data packet, the reporting URL where the database event is to be reported, and other pertinent information for reporting which do not have specifically designated fields.

BRIEF DESCRIPTION OF THE DRAWINGS

For a more detailed description of the embodiments of the disclosure, reference will now be made to the accompanying drawings, wherein.

DETAILED DESCRIPTION

This disclosure describes hardware units that rely on non-flashable circuitry (e.g., Application-Specific Integrated Circuits (ASICs), Field-Programmable Gate Arrays (FPGAs), or permanent Read-Only Memory (ROM) chips, or other burnable circuitry) for improving security on a public or private network. These hardware units can be added to a network without substantial modifications to the other devices already connected to the network. Thus, in contrast with known ways of detecting malware, which are solely software based, the hardware units are hardware that may be added to the public or private network. These hardware units detect, and sometimes block or drop, data packets or frames that contain an instruction of a known file-sharing protocol other than a reading instruction. Examples of known file-sharing protocols include, but are not limited to, the Server Message Block (SMB) protocol, the Network File System (NFS) protocol, the Apple Filing Protocol (AFP), or other protocols that may be developed in the future and are known at the time the hardware units are manufactured and/or in use. Examples of instructions other than a reading instruction include, but are not limited to, instructions to create a file, insert data in a file, delete a file, update, rename a file, or write on a file. Thus, potential malware may be detected instantaneously by what it attempts to do, typically the creation, insertion, deletion, update, renaming, or writing of files. Thus, in contrast with current ways of detecting malware based on software, which rely on algorithms to identify malware embedded in files or to identify anomalies in a network, the hardware units rely on the execution of commands included in data packets or frames.

Figure 1:
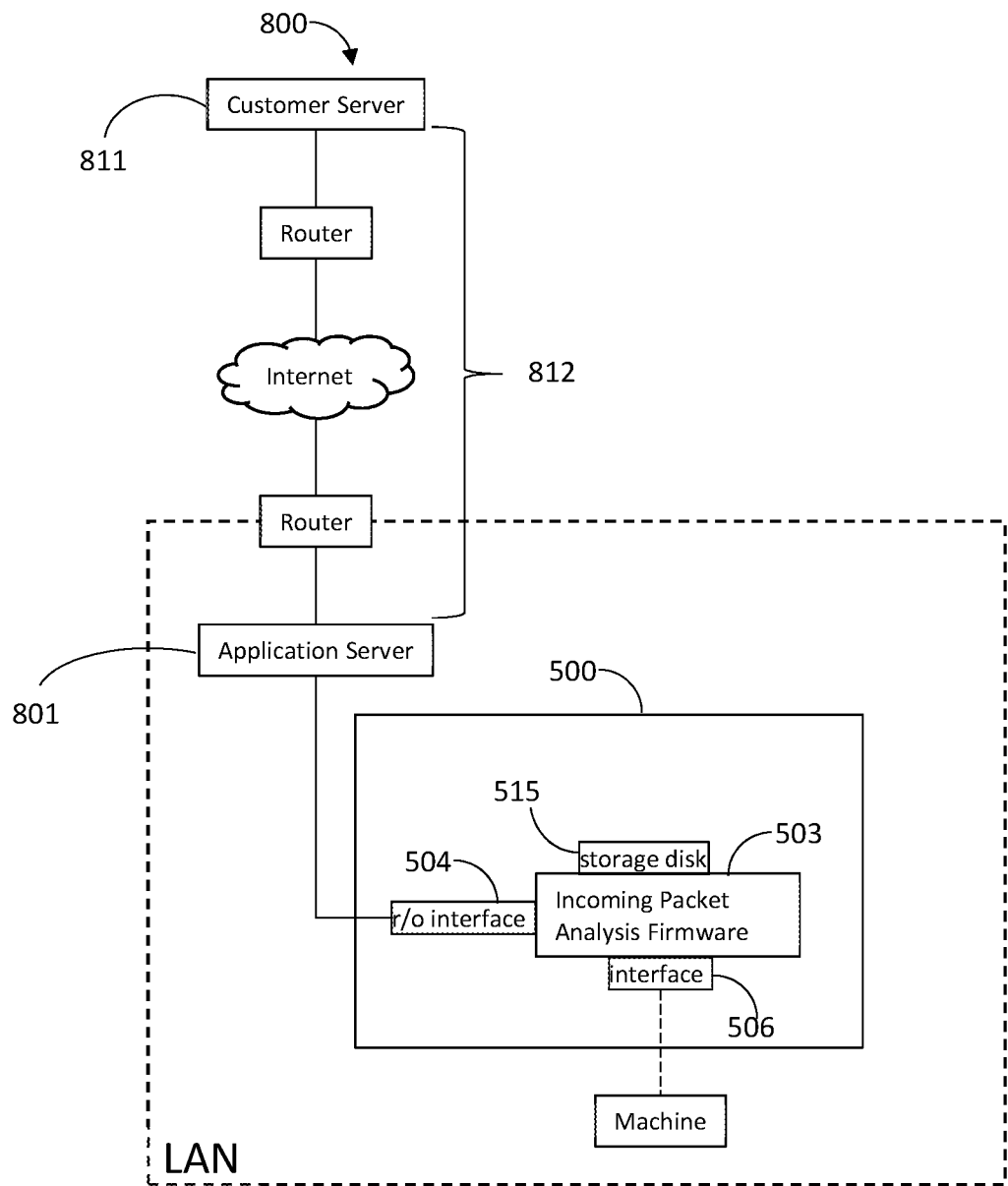
FIG. 1 is a schematic of a system for screening files or emails stored on a client device, wherein the system includes an application server and a hardware unit relying on non-flashable circuitry.

FIG. 1 illustrates a preferred embodiment of a system 100 for screening files or emails stored on a customer server 811. For example, the customer server 811 may be a file server or an email server.

The system 100 includes an application server 801, a hardware unit 500 having an incoming packet analysis firmware 503, and a machine. The application server 801 is connected via a wireless or wired connection to a read-only (r/o) interface 504 of the hardware unit 500. The machine is connected via a wireless or wired connection to a local interface 506 of the hardware unit 500. The application server 801, the hardware unit 500, and the machine are part of the same Local Area Network (LAN). The system 100 may be connected, for example, to the Internet via a router.

The customer server 811 may be connected, for example, to the Internet via a router. As such, the customer server 811 is connected to the application server 801 via connection 812, which, in this embodiment, includes the Internet.

Figure 2:
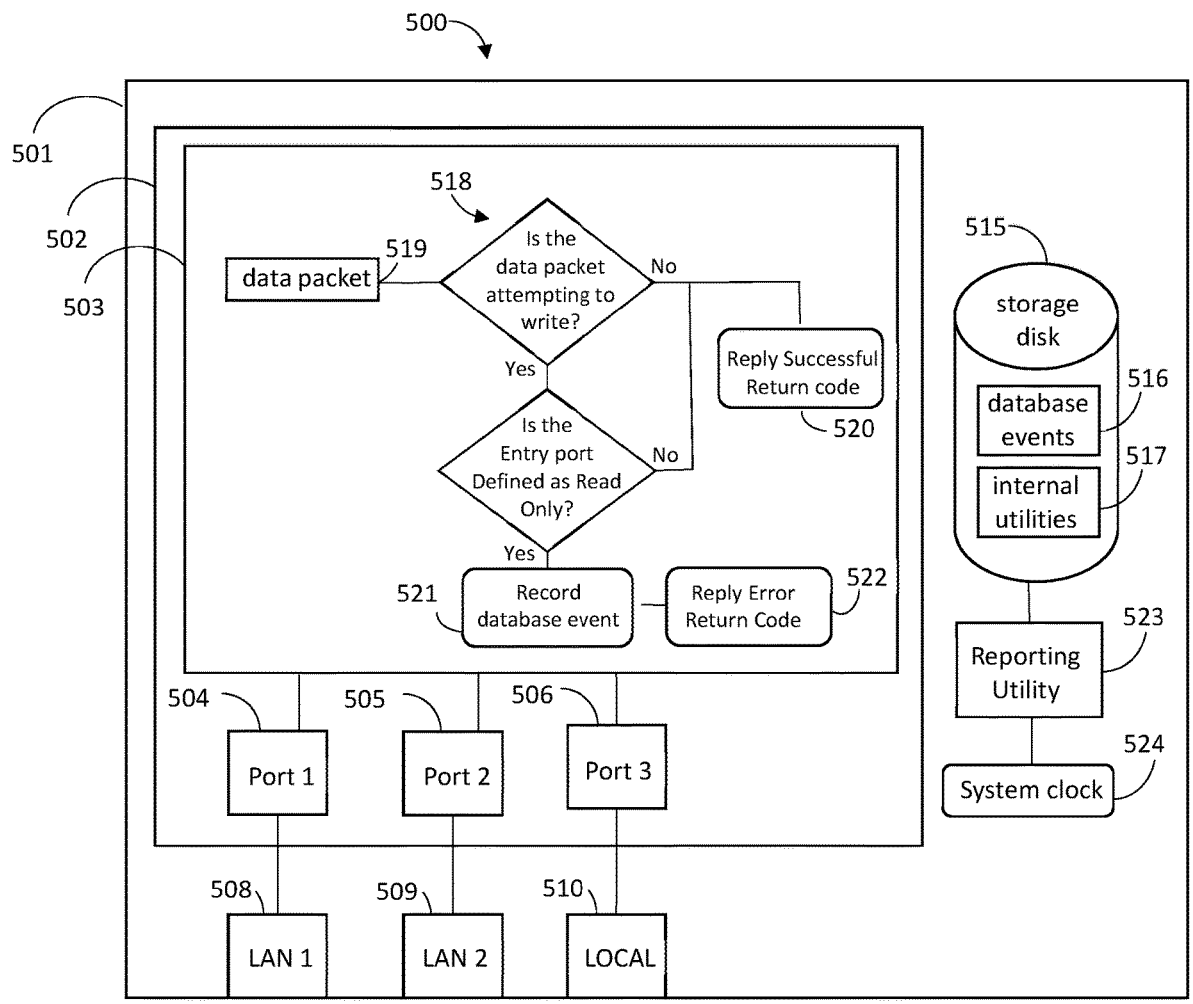
FIG. 2 is a schematic of the hardware unit relying on non-flashable circuitry shown in FIG. 1.

FIG. 2 is a block diagram of the hardware unit 500, which provides the basis for additional computer applications to check for the existence of malware in other systems and networks, such as the customer server 811 shown in FIG. 1, without using conventional means or identity algorithms to do so.

The hardware unit 500 includes an enclosure 501. The enclosure 501 contains a motherboard 502, which controls the operation of the hardware unit 500. The enclosure 501 also contains a storage disk 515 that is used to capture database events 516 and house internal utilities 517. The enclosure 501 further contains three connections: LAN1 508, LAN2 509, and LOCAL 510. The enclosure 501 may contain more or fewer connections.

The motherboard 502 contains three interfaces: Port1 504, Port2 505, and Port3 506. Port1 504 is connected to LAN1 508. Port2 505 is connected to LAN2 509. Port3 is connected to LOCAL. Upon installation of the hardware unit 500, Port1 504 and Port2 505 can be configured (e.g., their processor chips can be burned, or a physical toggle can be manipulated) as read-only (r/o) or read-write (r/w).

The motherboard 502 contains embedded firmware 503, which uses logic for the hardware unit 500 and controls the behavior of the hardware unit 500. The firmware 503 is implemented with non-flashable circuitry, whereby the firmware 503 cannot be updated from a remote location. The firmware 503 contains embedded logic to process data packets 519, which are received from one of Port1 504, Port2 505, or Port3 506, and destinated to another of Port1 504, Port2 505, and Port3 506.

The embedded logic 518 first checks the data packet 519 to determine in particular if the data packet 519 is trying to write. More generally, the embedded logic 518 first checks the data packet 519 to determine whether the data packet 519 contains an instruction of a known file-sharing protocol other than a reading instruction, which may be an instruction to create, insert data, delete, update, rename, or write. If not, then the embedded logic 518 replies with a successful return code 520. If the data packet 519 is trying to write or more generally contains an instruction other than a reading instruction, then the embedded logic 518 makes an additional check to see if the entry port of the data packet 519 is configured as read-only. If not, then the embedded logic 518 replies with a successful return code 520. If the entry port is configured as read-only, then the embedded logic 518 records a database event 521 in the database events 516 portion on the storage disk 515 and then replies with an error return code 522. In the example shown in FIG. 2, the embedded logic 518 finally drops the data packet 519. However, in other examples, the embedded logic 518 may allow the conditional or unconditional passage of the data packet 519 to its destination port. For example, the embedded logic 518 may allow the passage of the data packet 519 to its destination port unless the data packet 519 contains an instruction to create, insert data, delete, update, rename, or write.

The database events 516 portion of the storage disk 515 contains the following information for each event: a unit identifier of the hardware unit 500, a sequentially generated event identifier, a client identifier of the customer, the current date, the current time, an error return code 522, an event type, a result which describes the action taken by the hardware unit 500, the directory of the file which sent the data packet 519, the source address of the URL which sent the data packet 519, the filename for the source which sent the data packet 519, the destination address of the data packet 519, the reporting URL where the database event 516 is to be reported, and other pertinent information for reporting which do not have specifically designated fields.

The hardware unit 500 has a reporting utility 523, which resides in the internal utilities 517 portion of the storage disk 515. The reporting utility 523 reads the system clock 524 periodically and then reads the database events 516 and electronically transmits the database events 516 that have not been previously reported to an external location.

Back in reference to the example of FIG. 1, the application server 801 is programmed to retrieve a file or an email stored on the customer server 811, and open or execute the file or email on a virtual machine hosted on the application server 801. When the file or email is opened or executed and contains malware, the malware will inspect the LAN to identify other machines to infect and try to duplicate itself on these other machines. In this example, the malware will identify the machine connected to the local interface 506. In order to duplicate itself, the malware will try to access the file system hosted on the machine connected to the local interface 506 and, in particular, write on the file system. More generally, the malware will send data packets from the virtual machine hosted on the application server 801 via the read-only (r/o) interface 504 and toward the machine connected to local interface 506, and these data packets will contain an instruction of a known file-sharing protocol other than a reading instruction, which may be an instruction to create, insert data, delete, update, rename, or write. Thus, these data packets will enter the hardware unit 500 through connection LAN1 508 shown in FIG. 2 and interface Port1 504.

The basis for screening files or emails that contain malware is that the interface 504 is configured as read-only (and the interface 506 may be configured as read/write). Thus, the hardware unit 500 provides additional computer applications to check for the existence of malware in the customer server 811. Also, the hardware unit 500 may protect the machine shown in FIG. 1 from cyber attacks.

Figure 3A:
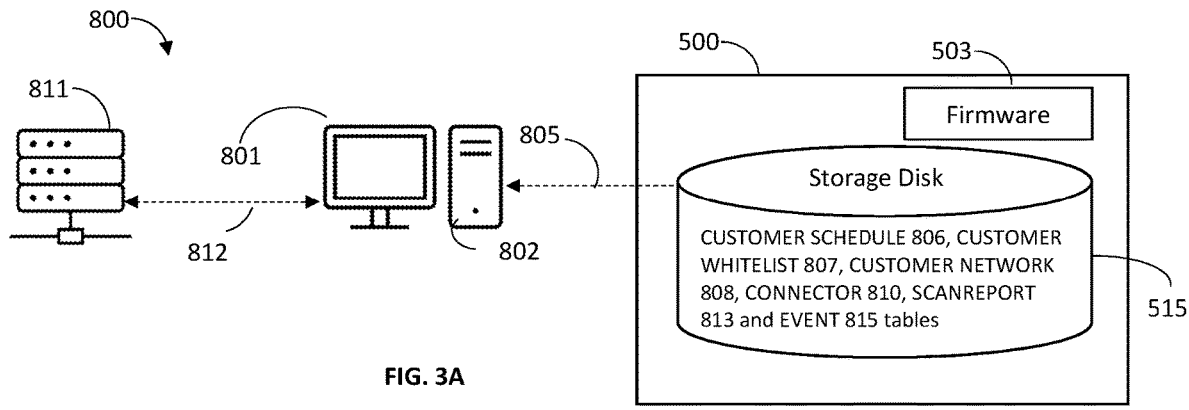
FIG. 3A is a schematic illustrating data flow in the system shown in FIG. 1.

FIG. 3A is a simplified representation of a portion of the system 800 in which a software application 802 searches other computer systems and networks, such as the customer server 811, for cyber threats using an unconventional method for identification of the cyber threats. The software application 802 resides on the application server 801, which is in the cloud/Internet from the perspective of the other computer systems and networks 811. The software application 802 starts a processing logic 803, illustrated in a block diagram shown in FIG. 3B, and then repeatedly calls the Process network Routine 809, illustrated in a block diagram shown in FIG. 3C. The processing logic 803 can read data stored on the storage disk 515 of the hardware unit 500 through the data connection 805. The Process network Routine 809 connects to the customer server 811 through the data connection 812 and retrieves a file or an email stored on the customer server 811. When the file or email is opened or executed on the application server 801, potential malware may be detected instantaneously by the firmware 503 by an attempt to create, insert data in, delete, update, rename, or write a file.

Figure 3B:
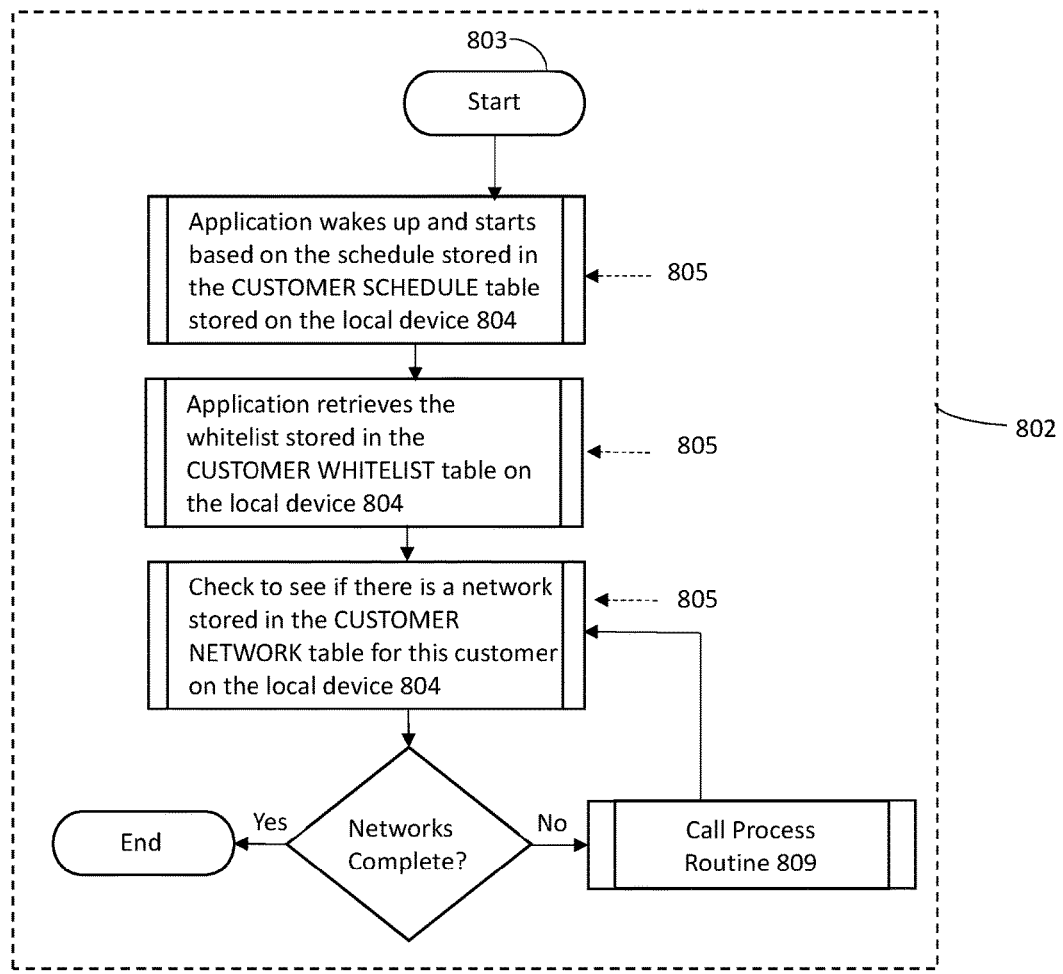
FIGS. 3B and 3C are flow charts illustrating a method for screening files or emails stored on a client device that can be implemented using the system shown in FIG. 1.

In reference to FIG. 3B, the processing logic 803 starts by reading the CUSTOMER SCHEDULE table 806 stored on the storage disk 515 through the data connection 805. The CUSTOMER SCHEDULE table 806 is comprised of the following fields: CUSTOMER ID, LOCATION ID, DEPLOYED ID, SCHEDULE ID, SCHEDULE DESCRIPTION, SCHEDULE DAY, SCHEDULE TIME, SCHEDULE FREQUENCY, SCHEDULE START, SCHEDULE END, AUTOMATED RUN IND, and SCANREPORTID. The processing logic 803 then retrieves the whitelist information from CUSTOMER WHITELIST table 807 stored on the storage disk 515 through the data connection 805. The CUSTOMER WHITELIST table 807 is comprised of the following fields: CUSTOMER ID, NETWORK ID, WHITELIST ID, DIRECTORY, and FILENAME. The processing logic 803 then retrieves the customer network information from the CUSTOMER NETWORK table 808 stored on the storage disk 515 through the data connection 805. The CUSTOMER NETWORK table 808 is comprised of the following fields: CUSTOMER ID, NETWORK ID, NETWORK NAME, and NETWORK CONNECTION SCHEME. The processing logic 803 then loops through the customer networks until all have been processed and then ends the software application 802. For each customer network stored in the CUSTOMER NETWORK table 808, the processing logic 803 calls and executes the Process network Routine 809.

Figure 3C:
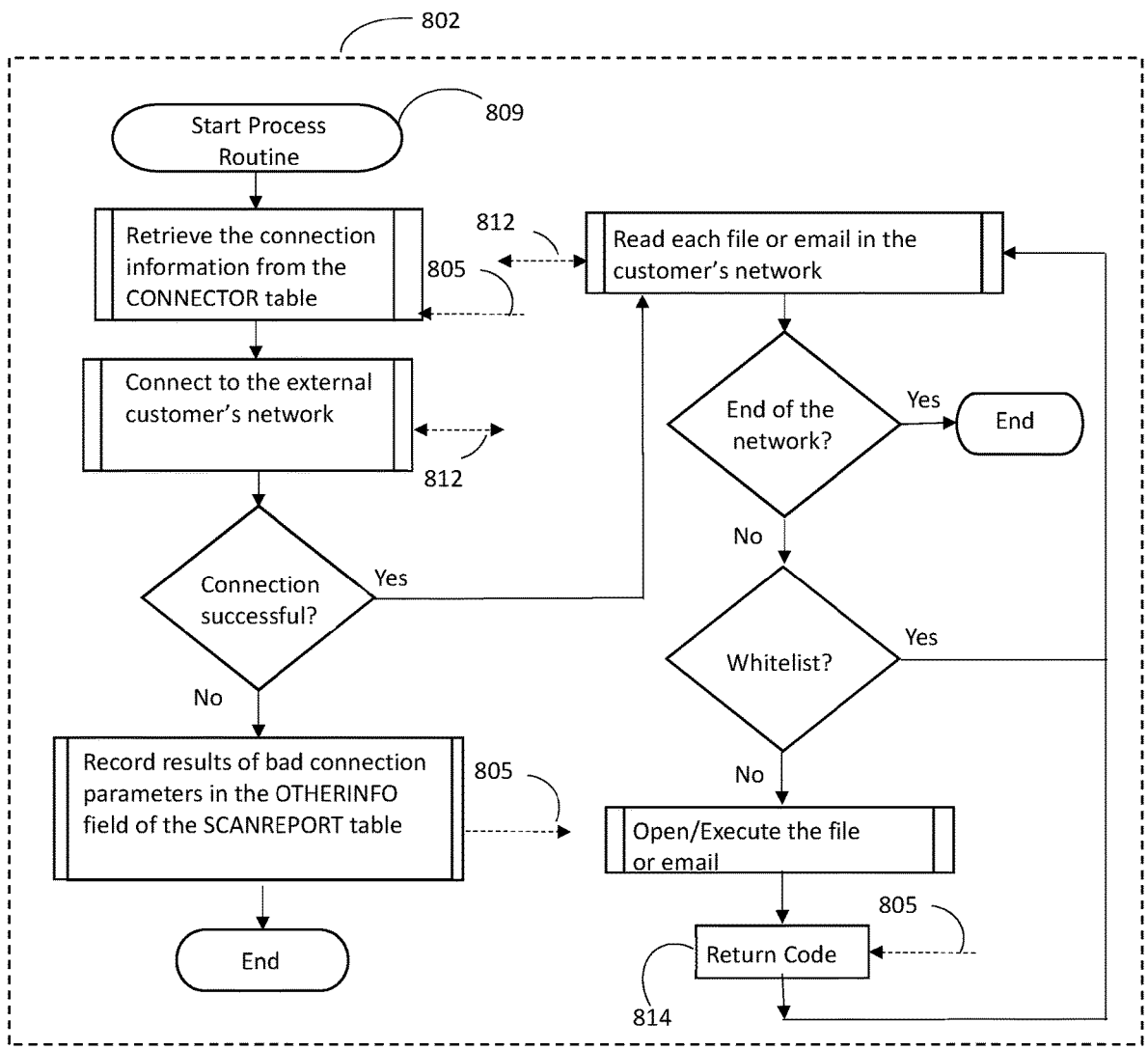

In reference to FIG. 3C, the Process network Routine 809 first retrieves the connector information from the CONNECTOR table 810 stored on the storage disk 515 through the data connection 805. The CONNECTOR table 810 is comprised of the following fields: CUSTOMER ID, NETWORK ID, NETWORK CONNECTOR ID, and NETWORK CONNECTOR. The Process network Routine 809 then uses the connector information and attempts to connect to the customer's network 811 through the data connection 812. If the connection is not successful, the Process network Routine 809 requests via the connection 805 that the hardware unit 500 records the results of the bad connection in the SCANREPORT table 813 stored on the storage disk 515 and then ends the Process network Routine 809. The SCANREPORT table 813 is comprised of one or more of the following fields: SCANREPORT ID, SCANREPORT TYPE, SCANREPORT DATE, SCANREPORT TIME, CUSTOMER ID, LOCATION ID, DEPLOYED ID, PRODUCT ID, RETURN CODE, EVENT TYPE, RESULT, DIRECTORY, FILENAME, SUSPECT ADDRESS, EMAIL DESTINATION, EMAIL ORIGIN, EMAIL SUSPECT and OTHERINFO. If the connection is successful, then the Process network Routine 809 reads each file or email in the customer's network 811. For each file or email in the customer's network 811, the Process network Routine 809 checks to see if the file or email is listed in the customer whitelist. If the file or email is in the customer's whitelist, the Process network Routine 809 advances to the next customer file. When all files for the customer's network 811 have been processed, the Process network Routine 809 ends processing for the customer's network 811. If the customer file is not in the customer's whitelist, the Process network Routine 809 either opens the file or email or executes the file or email in a virtual machine hosted on the application server 801 while connected to the read-only (r/o) interface 504 of the hardware unit 500 through the data connection 805. As shown in the embedded logic 518 shown in FIG. 2, the hardware unit 500 eventually records an entry in the EVENT table 815 and the SCANREPORT table 813 if it detects a write behavior or more generally a behavior other than a read behavior, and sends the Return Code 814 (i.e., either the successful return code 520 or the error return code 522). The Process network Routine 809 reads the Return Code 814 from the hardware unit 500 through the data connection 805, and then the Process network Routine 809 advances to the next customer file in the customer's network 811. The EVENT table 815 is comprised of the following fields: UNIT ID, EVENT ID, CLIENT ID, DATE, TIME, RETURN CODE, EVENT TYPE, RESULT, DIRECTORY FILENAME, SOURCE ADDRESS, DST ADDRESS, REPORTURL, and OTHERINFO.

In addition to the foregoing, the disclosure also contemplates at least the following embodiments. It should be noted that any element of any embodiments 1-13 may further include details related to this element that are disclosed in a paragraph or Figure describing the preferred embodiments without including details of other elements that are disclosed in the same or other paragraph or Figure.

Embodiment 1

Embodiment 1 is a system for screening files or emails stored on a client device. The system comprises an application server, a machine, a storage medium, and an apparatus as follows.

The application server is connectable to the client device via a public or private network. Moreover, the application server is programmed to retrieve a file or an email stored on the client device and open or execute the file or email on a virtual machine hosted on the application server.

The machine is any machine that is recognized as a network node when connected to the apparatus. As such, the machine has a media access control ("MAC") address and runs a transport protocol.

The storage medium is any storage medium, such as a disk, flash memory, or solid-state drive, or a combination thereof. The storage medium may or may not be integrated into the apparatus.

The apparatus includes an enclosure and non-flashable circuitry located in the enclosure. The enclosure has at least first and second connections, which are either wired or wireless. The non-flashable circuitry is connected to the application server via the first connection. The non-flashable circuitry is connected to the machine via the second connection. The non-flashable circuitry is configured to receive data packets or frames from the application server via the first connection, determine whether the data packets or frames contain an instruction of a known file-sharing protocol other than a reading instruction, and record a database event on the storage medium when the data packets or frames contain the instruction other than the reading instruction. The database event includes at least data indicative of a time when data packets or frames are received, and data indicative of the client device. The database event may include additional data.

Determining whether the data packets or frames contain the instruction other than the reading instruction may involve testing whether the data packets or frames contain any of an instruction to either create a file, insert data in a file, delete a file, update a file, rename a file, or write on a file. In some cases, all these tests are performed. However, more or fewer than all these tests could be performed.

Embodiment 2

Embodiment 2 is a system as described in embodiment 1, wherein the storage medium is located in the enclosure. The non-flashable circuitry is further configured to periodically (e.g., based on an internal or external clock signal) inspect the storage medium for one or more newly recorded database events. The non-flashable circuitry is further configured to transmit the one or more newly recorded database events. In order to do so, the non-flashable circuitry may, for example, use the first or the second connection to send data packets or frames to create or update a file on the application server. Alternatively, the non-flashable circuitry may use another connection to create or update a file on a node (e.g., a machine, a storage medium) connected to the other connection.

Embodiment 3

Embodiment 3 is a system as described in embodiments 1 or 2, wherein the client device specifically includes a computer or a server, the machine specifically includes a blade server, and the storage medium specifically includes a disk.

Embodiment 4

Embodiment 4 is a system as described in any of embodiments 1 to 3, wherein the data indicative of the time when a data packet or frame containing the instruction other than the reading instruction is received specifically includes a current date and a current time, and wherein the data indicative of the client device specifically includes a client identifier of a customer.

Embodiment 5

Embodiment 5 is a system as described in embodiment 4, wherein the database event specifically includes one or more of the following:
  an identifier of the apparatus,
  a sequentially generated event identifier,
  the client identifier of the customer,
  the current date,
  the current time,
  an error return code,
  an event type,
  data indicative of an action taken by the apparatus,
  a directory of the file which sent the data packet or frame containing the instruction other than the reading instruction,
  the source address of the universal resource locator ("URL") which sent the data packet or frame containing the instruction other than the reading instruction,
  the filename for the source which sent the data packet or frame containing the instruction other than the reading instruction,
  the destination address of the data packet or frame containing the instruction other than the reading instruction, and
  a reporting URL where the database event is to be reported.

Embodiment 6

Embodiment 6 is a system as described in any of embodiments 1 to 5, wherein the application server and the machine are in the same local area network ("LAN"). As such, malware embedded in the file or email opened or executed on the virtual machine hosted on the application server can detect that the machine is part of the LAN, and possibly attempt to duplicate itself on the machine. When doing so, the malware will data send packets or frames containing an instruction of a known file-sharing protocol other than a reading instruction from the application server to the machine, and these packets or frames will be detected by the apparatus.

Embodiment 7

Embodiment 7 is a system as described in any of embodiments 1 to 6, wherein the non-flashable circuitry is further configured to discard all the data packets or frames. Alternatively, the data packets or frames could be discarded only when the data packets or frames contain the instruction other than the reading instruction.

Embodiment 8

Embodiment 8 is a system as described in any of embodiments 1 to 7, wherein the first and second connections are specifically wired connections.

Embodiment 9

Embodiment 9 is a method of screening files or emails stored on a client device. The method comprises the steps:
  providing a system as described in any of embodiments 1 to 8,
  retrieving a file or an email stored on the client device,
  opening or executing the file or email on a virtual machine hosted on the application server, receiving data packets or frames from the application server via the first connection;
determining whether the data packets or frames contain an instruction of a known file-sharing protocol other than a reading instruction, and
recording a database event on the storage medium when the data packets or frames contain the instruction other than the reading instruction.

The database event includes at least data indicative of a time when data packets or frames are received, and data indicative of the client device.

Embodiment 10

Embodiment 10 is a method as described in embodiment 9, further comprising the step of discarding the data packets or frames.

Embodiment 11

Embodiment 11 is a method as described in embodiments 9 or 10, further comprising the steps of:
periodically inspecting the storage medium for one or more newly recorded database events, and
transmitting the one or more newly recorded database events.

The one or more newly recorded database events may be transmitted to the application server, the client device, or any other machine connected to the apparatus.

Embodiment 12

Embodiment 12 is a method as described in any of embodiments 9 to 11, wherein the data indicative of the time when a data packet or frame containing the instruction other than the reading instruction is received, includes a current date and a current time, and wherein the data indicative of the client device includes a client identifier of a customer.

Embodiment 13

Embodiment 13 is a method as described in embodiment 12 wherein the database event includes specifically includes one or more of the following:
an identifier of the apparatus,
a sequentially generated event identifier,
the client identifier of the customer,
the current date,
the current time,
an error return code,
an event type,
data indicative of an action taken by the apparatus,
a directory of the file which sent the data packet or frame containing the instruction other than the reading instruction,
the source address of the universal resource locator ("URL") which sent the data packet or frame containing the instruction other than the reading instruction,
the filename for the source which sent the data packet or frame containing the instruction other than the reading instruction,
the destination address of the data packet or frame containing the instruction other than the reading instruction, and
a reporting URL where the database event is to be reported.

Specific embodiments of the invention are shown by way of examples in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A system, comprising:
an application server connectable to a client device, wherein the application server is programmed to:
retrieve a file or an email stored on the client device; and
open or execute the file or email on a virtual machine hosted on the application server;
a machine;
a storage medium; and
an apparatus for screening files or emails stored on the client device for malware potentially embedded into the files or emails that causes data packets or frames to be sent over a public or private network, including:
an enclosure having first and second connections;
non-flashable circuitry located in the enclosure, wherein the non-flashable circuitry is connected to the application server via the first connection and the non-flashable circuitry is connected to the machine via the second connection, and wherein the non-flashable circuitry is configured to:
receive data packets or frames from the virtual machine hosted on the application server via the first connection;
determine whether the data packets or frames contain an instruction of a known file-sharing protocol other than a reading instruction;
record a database event on the storage medium when the data packets or frames contain the instruction other than the reading instruction, wherein the database event includes data indicative of a time when data packets or frames are received, and data indicative of the client device.

2. The system of claim 1, wherein
the storage medium is located in the enclosure,
the non-flashable circuitry is further configured to periodically inspect the storage medium for one or more newly recorded database events; and
the non-flashable circuitry is further configured to transmit the one or more newly recorded database events.

3. The system of claim 2, wherein
the client device includes a computer or a server;
the machine includes a blade server; and
the storage medium includes a disk, flash memory, or a solid-state drive, or a combination thereof.

4. The system of claim 2 wherein the data indicative of the time when a data packet or frame containing the instruction other than the reading instruction is received, includes a current date and a current time, and wherein the data indicative of the client device includes a client identifier of a customer.

5. The system of claim 4 wherein the database event includes an identifier of the apparatus, a sequentially generated event identifier, the client identifier of the customer, the current date, the current time, an error return code, an event type, data indicative of an action taken by the apparatus, a directory of the file which sent the data packet or frame containing the instruction other than the reading instruction, the source address of the URL which sent the data packet or frame containing the instruction other than the reading instruction, the filename for the source which sent the data packet or frame containing the instruction other than the reading instruction, the destination address of the data packet or frame containing the instruction other than the reading instruction, a reporting URL where the database event is to be reported.

6. The system of claim 2, wherein the application server and the machine are in the same local area network.

7. The system of claim 2, wherein the non-flashable circuitry is further configured to discard the data packets or frames.

8. The system of claim 2, wherein the first and second connections are wired connections.

9. A method, comprising:
connecting an application server to a client device, wherein the application server is programmed to:
retrieve a file or an email stored on the client device; and
open or execute the file or email on a virtual machine hosted on the application server;
a machine;
a storage medium; and
providing an apparatus for screening files or emails stored on the client device for malware potentially embedded into the files or emails that causes data packets or frames to be sent over a public or private network, including:
an enclosure having first and second connections; and
non-flashable circuitry located in the enclosure;
connecting the non-flashable circuitry to the application server via the first connection; and
connecting the non-flashable circuitry to the machine via the second connection, and
wherein the non-flashable circuitry is configured to:
receive data packets or frames from the virtual machine hosted on the application server via the first connection;
determine whether the data packets or frames contain an instruction of a known file-sharing protocol other than a reading instruction;
record a database event on the storage medium when the data packets or frames contain the instruction other than the reading instruction, wherein the database event includes data indicative of a time when data packets or frames are received, and data indicative of the client device.

10. The method of claim 9, wherein
the storage medium is located in the enclosure,
the non-flashable circuitry is further configured to periodically inspect the storage medium for one or more newly recorded database events; and
the non-flashable circuitry is further configured to transmit the one or more newly recorded database events.

11. The method of claim 10, wherein
the client device includes a computer or a server;
the machine includes a blade server; and
the storage medium includes a disk, flash memory, or a solid-state drive, or a combination thereof.

12. The method of claim 10 wherein the data indicative of the time when a data packet or frame containing the instruction other than the reading instruction is received, includes a current date and a current time, and wherein the data indicative of the client device includes a client identifier of a customer.

13. The method of claim 12 wherein the database event includes an identifier of the apparatus, a sequentially generated event identifier, the client identifier of the customer, the current date, the current time, an error return code, an event type, data indicative of an action taken by the apparatus, a directory of the file which sent the data packet or frame containing the instruction other than the reading instruction, the source address of the URL which sent the data packet or frame containing the instruction other than the reading instruction, the filename for the source which sent the data packet or frame containing the instruction other than the reading instruction, the destination address of the data packet or frame containing the instruction other than the reading instruction, a reporting URL where the database event is to be reported.

14. The method of claim 10, wherein the application server and the machine are in the same local area network.

15. The method of claim 10, wherein the non-flashable circuitry is further configured to discard the data packets or frames.

16. The method of claim 10, wherein the first and second connections are wired connections.

* * * * *